US012031713B1

(12) United States Patent
Kellison et al.

(10) Patent No.: US 12,031,713 B1
(45) Date of Patent: Jul. 9, 2024

(54) INDIRECT LIGHTING FIXTURE

(71) Applicant: Insight Lighting, Inc., Rio Rancho, NM (US)

(72) Inventors: Steven Kellison, Rio Rancho, NM (US); Jaxon Patterson, Rio Rancho, NM (US)

( * ) Notice: Subject to any disclaimer, the term of this patent is extended or adjusted under 35 U.S.C. 154(b) by 0 days.

(21) Appl. No.: 18/381,398

(22) Filed: Oct. 18, 2023

(51) Int. Cl.

| | |
|---|---|
| ***F21V 5/00*** | (2018.01) |
| ***F21S 8/06*** | (2006.01) |
| ***F21V 7/00*** | (2006.01) |
| ***F21Y 115/10*** | (2016.01) |

(52) U.S. Cl.
CPC .............. *F21V 5/008* (2013.01); *F21S 8/061* (2013.01); *F21V 7/0008* (2013.01); *F21V 7/0016* (2013.01); *F21V 7/005* (2013.01); *F21Y 2115/10* (2016.08)

(58) Field of Classification Search
CPC ...... F21V 5/008; F21V 7/0008; F21V 7/0016; F21V 7/005; F21S 8/061; F21Y 2115/10
See application file for complete search history.

(56) References Cited

U.S. PATENT DOCUMENTS

2020/0340642 A1* 10/2020 Patterson .............. F21V 21/008

* cited by examiner

*Primary Examiner* — Anne M Hines
*Assistant Examiner* — Jose M Diaz
(74) *Attorney, Agent, or Firm* — Rod D. Baker

(57) ABSTRACT

A lighting apparatus and system which employs light sources, preferably LED boards, situated in parallel housing platforms. Two lighting platforms are arranged in a spaced-apart relationship to provide indirect lighting to the surrounding environment. Each platform mounts a light source, such as a series of LED boards. Each LED board functions as an indirect lighting source. The first one of the platforms emits light toward a nearby architectural feature or surface (e.g., a room wall or ceiling) for reflection to the environment to be lighted. A second of the platforms emits light toward the first platform; the light emitted from the second platform is reflected from the first platform to the environment to be lighted.

7 Claims, 7 Drawing Sheets

INDIRECT LIGHTING FIXTURE

BACKGROUND OF THE INVENTION

Field of the Invention

This invention relates to lighting fixtures, and particularly to aesthetic light fixtures incorporating light emitting diodes.

Background Art

Artificial light sources and fixtures have long been known for illuminating the interiors and exteriors of buildings and dwellings. Light sources using light emitting diodes (LED) as light sources are known. LED boards are commercially available as light sources, and multiple LED boards may be arranged in various configurations and arrays inside a fixture to provide light to an ambient environment.

SUMMARY OF THE DISCLOSURE

There is disclosed a lighting apparatus and system which employs light sources, preferably LED boards, situated in parallel housing platforms. A basic embodiment of the apparatus includes two lighting platforms arranged in a spaced-apart positional relationship to provide indirect lighting to the surrounding environment. Each platform mounts a light source, such as a series of LED boards. Each LED board functions as an indirect lighting source. The first one of the platforms emits light toward a nearby architectural feature or surface (e.g., a room wall or ceiling) for reflection to the environment to be lighted. A second of the platforms emits light toward the first platform; the light emitted from the second platform is reflected from the first platform to the environment to be lighted. The present apparatus and system are preferably modular in character to permit the system to be adaptively configured in a variety of arrangements and arrays. Moreover, the apparatus is visually aesthetic and readily harmonized with a wide assortment of interior design schemes and architectural regimes.

Broadly characterized, the invention includes a lighting apparatus comprising at least one module having a longitudinal axis and including: (1) a first platform having a first housing having a first light source thereon; (2) a second platform having a second housing having a second light source thereon; and (3) at least one, typically two, hubs connecting the first and second platforms together and holding the housings in spaced-apart relation, there being a separation distance defined between the platforms. Light originating from the first light source, preferably LED board(s), is transmitted from the first housing through a first control lens and then is reflected from a nearby surface to provide indirect lighting to the surrounding environment. The second light source, preferably also LED board(s), projects light through a second control lens and directly from the second housing across the separation distance toward the first housing, and the first housing reflects at least a portion of the light from the second light source, thereby to emit indirect lighting from the module.

Two or more modules may be combined in series in a wide variety of lighting system configurations. The modularity of the modules and a variety of hub configurations contribute to possible lighting systems of wide variety and versatility. Further features of the present invention will be apparent from the following description of exemplary embodiments with reference to the attached drawings.

BRIEF DESCRIPTION OF THE DRAWINGS

Embodiments of the invention can be better understood with reference to the following drawings, which form part of the specification and represent preferred embodiments. The drawings are not necessarily to scale (either within a view or between views), emphasis instead being placed upon illustrating the principles of the invention. In the drawings, like reference numerals designate corresponding elements throughout the several views. In the drawings.

DETAILED DESCRIPTION OF THE INVENTION

Figure 1A:
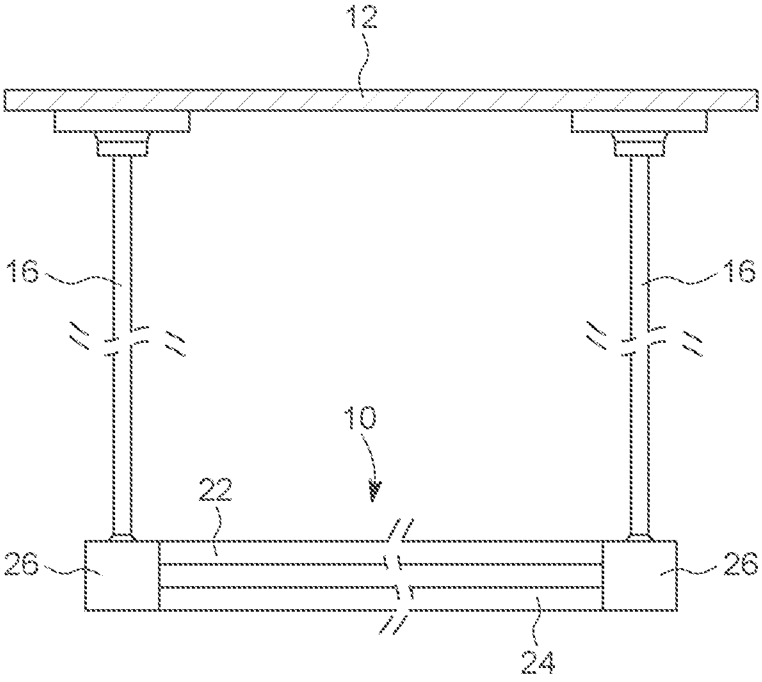
FIG. 1A is a side elevation view of a basic apparatus according to the present disclosure, showing an inventive module suspended from an overhead surface such as a ceiling.

Disclosed is an apparatus or system for lighting areas of interest within or about buildings, dwellings, or other structures. It is contemplated that the invention finds particularly desirable use within residential homes and commercial buildings, but is not limited in its circumstance of use. The present disclosure provides an innovative approach to indirect lighting. With “indirect lighting,” the actual source of light is concealed from view and the light spreads through the environs via reflection from secondary surfaces such as walls and/or ceilings. In a typical example, the environment is an interior room, and light is transmitted directly from a source hidden within a fixture in the room to then reflect from the ceiling, and/or floor, and/or wall. Indirect lighting beneficially reduces or eliminates undesirable dazzle and shadows, and can be strategically deployed to affect mood or ambiance.

Designed for architectural lighting applications, the present invention may be installed in residential or commercial spaces to be used as a general lighting tool. The apparatus and system provide effective indirect light throughout a space in either a spectrum of white lights or color-changing lighting. It is contemplated, without limitation, that the apparatus is an “A-type” fixture: a lighting tool that is the primary light source for a habited space and which is a primary fixture in an installation. A-type fixtures provide the standard lighting throughout an environs and may be complemented or supplemented by other satellite fixtures with more specific or personal lighting intent or tasks. Nevertheless, the apparatus according to this invention may be adapted in certain circumstances to serve as a source of accent lighting.

A lighting module according to this disclosure provides omni-directional light that is functional while also decorative. A module's two platforms use linear optics to produce a batwing beam of indirect light, and a reflected lateral/downlight beam. This allows the fixture to be used in spaces where indirect performance is required, yet with the added benefit of comfortable ambient light. The separation of the module's two platforms creates an aesthetic frame and view port of its surrounding environment. Preferably utilizing high-efficacy LED boards and an all-aluminum adhesive-free assembly, a module is built for efficient power consumption and advantageous end-of-life recyclability.

Some installations according to the present invention may be one or more single-module fixtures, independent of each other, above work stations or in hallways. The invention includes the option for continuous runs of serially connected fixture modules, which could be used, for example, down the center of a hallway in long runs without breaks between modules. Multiple module fixtures may also be used to create rectangular shapes, which could take the form of independent hanging installations, or configured as right angles to wrap around hallway corners.

Cables from which module(s) may be suspended have integrated wiring which allow the power and control signals to be transferred internally, providing a cleaner "look" for the apparatus overall. Alternatively or additionally, one or more modules may be secured to a ceiling or wall by rigid frame means. Multiple lighting modules can be combined together to form large lighting installations. A module combines two platforms with open air space between them as graphical elements. Accordingly, the invention provides not only a functional lighting module and modular system, but also a visually aesthetic lighting tool.

Thus disclosed hereinafter is an optical solution to transfer light from one platform through open air to illuminate a physically separated reflective platform. The invention provides a double indirect light fixture where indirect light from a second platform reflects off a side of a first indirect lighting platform to create a double batwing or "butterfly" beam pattern.

Figure 1B:
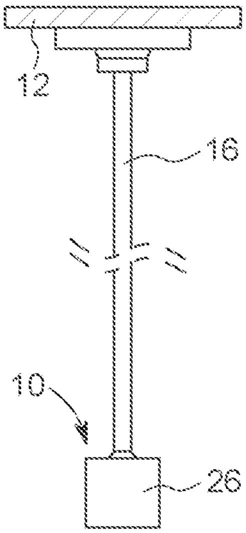
FIG. 1B is an end view of the apparatus seen in FIG. 1A.
Figure 2A:
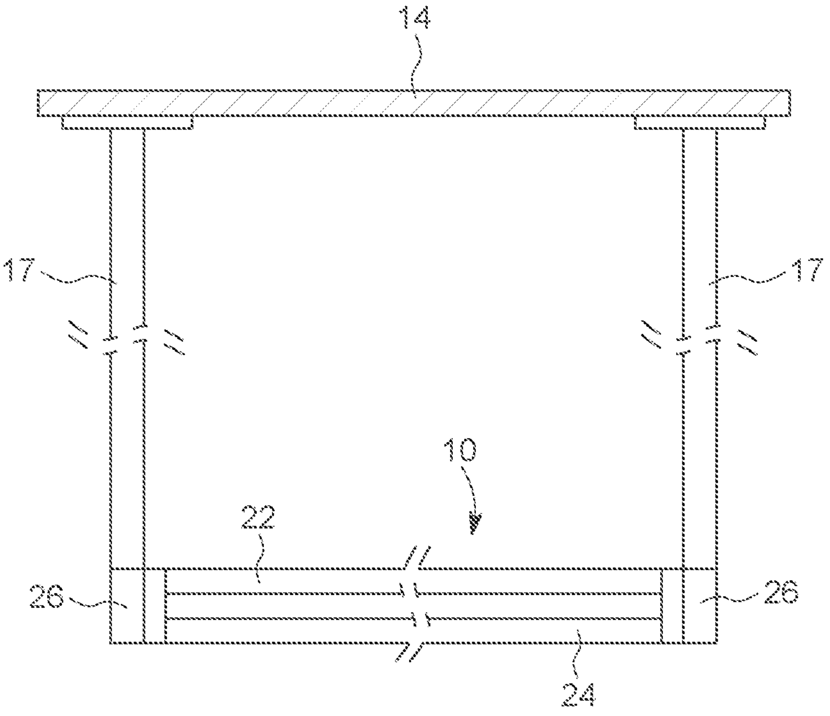
FIG. 2A is a top plan vies of a basic apparatus according to the present disclosure, showing an inventive module rigidly extended from a nearby (vertical) surface such as a wall.
Figure 2B:
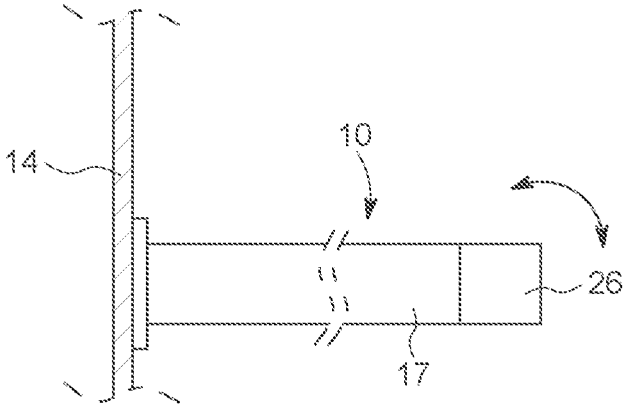
FIG. 2B is an end view of the apparatus seen in FIG. 2A.

Combined reference is invited to FIGS. 1A-B and 2A-B, depicting a single module 10 according to this apparatus and system. In the embodiment of FIGS. 1A-B, each module 10 is suspended from a ceiling 12 or other suitable (overhead) supporting structure. At least one, preferably at least two, power suspension cables 16 are securely attached to the ceiling 12 or other structure to hang the module 10, and preferably supply electrical power from the electrical grid or other power source to the module. Alternatively, as seen in FIGS. 2A-B, a module 10 may be attached to a wall 14 or other suitable (typically but not necessarily vertical) supporting surface. At least one, preferably at least two, rigid (typically but not necessarily horizontal) supports 17 are securely attached to the wall 14 to cantilever the module 10 into the space to be illuminated, and preferably supply electrical power to the module from the building's electricity source.

A single module 10 has a hub 26 on each end of the module, to which a suspension cable 16 or support 17 (FIGS. 1A-B and 2A-B) is connected; power is delivered from the cable/support into at least one of the hubs 26 for powering the electrical components and light sources of the module. The cables 16 or supports 17 can be adapted to suitable length to locate the module 10 an appropriate distance below the ceiling 12, or away from the supporting surface 14, and a selected distance above the areas and workspaces to be illuminated. A module 10 may be fabricated to have any of many lengths; standard axial modular lengths may range, for example, from nominal 24 inches to 96 inches (e.g., in 12-inch increments).

Figure 3:
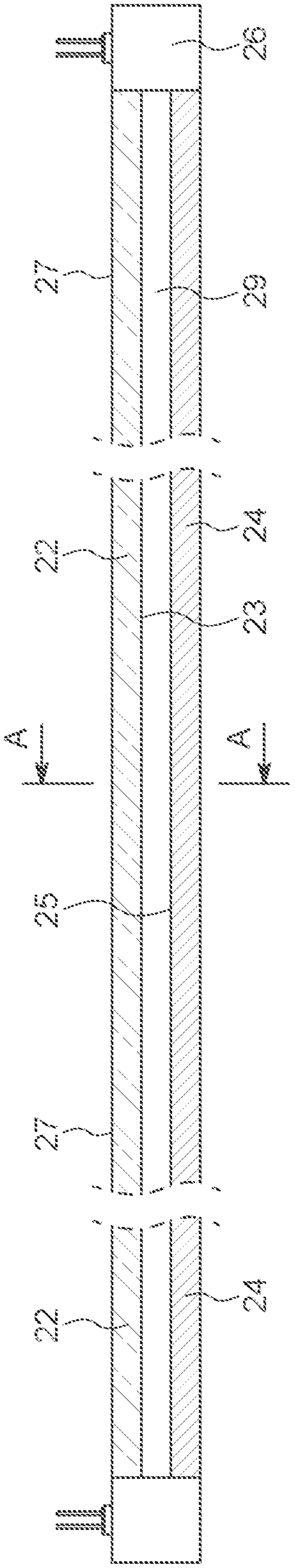
FIG. 3 is another side view of an inventive lighting module according to this disclosure, similar to the modular depicted in FIGS. 1A-2B.

A single module 10 as seen in the side view of FIG. 3 has a hub 26 on each end of the module. Hubs 26 are used to connect together the adjacent ends of a pair modules (e.g., FIG. 5), or to close or cap the ends of a single module 10. A hub 26 may be fabricated, for example, from extruded aluminum. In an embodiment, a hub 26 is hollow with a rectangular vertical cross section, with a capped side opposite the platforms 22, 24. Hubs 26 contain and/or channel electrical components. The hub 26 on the end of a module 10, or shared by two modules 10, 10', serves as a termination point for a module but also as a mounting point for a suspension cable 16 or support 17. A hub 26 can also be adapted for use as a thorough-way section for continuous runs of lighting modules 10, or a corner component for square installations (the discussion of this paragraph is detailed in our U.S. Pat. No. 10,823,367, which is incorporated herein by reference). Again, the hub 26 is connected to the suspension cable 16 or support 17 which also transfers electrical power through the hub to other portions of the module 10.

Continued reference is invited to FIG. 3. In an embodiment, a module 10 includes a first platform 22, a second platform 24 and the two hubs 26. FIGS. 1A-B and 2A-B show that in a normal usage, the module 10 is elongated along a substantially horizontal, longitudinal, (imaginary) axis. Hubs 26 comprise the respective ends of the module 10 to hold the first platform 22 and the second platform 24 substantially parallel to each other, the first platform 22 being situated above the second platform 24 in the embodiment of FIGS. 1A and 1B. In the embodiment of FIGS. 2A and 2B, the first platform 22 and the second platform 24 are usually situated nearby to one another at the same vertical elevation, and typically are parallel and horizontal. In specialized conditions, the supports 17 may be disposed to define a non-right-angle with the wall or supporting surface 14. Further, it may be provided in an alternative embodiment that the platforms 22, 24 are pivotal in the hubs 26 (i.e., about a pivotal axis parallel to the module's longitudinal axis; see directional arrows of FIG. 2B) to customize the direction of light emission from the module 10 relative to the wall or ceiling.

By way of example only, a module 10 may be about 1.25 inches in height and about 1.25 inches in lateral width. In such an embodiment, each of the platforms 22, 24, may have height/width dimensions of 1.25 inches and 0.41 inches (e.g., for a wall-mounted embodiment as seen in FIGS. 2A-B, a height of 1.25 inches and lateral thickness of 0.41 inches). In a module 10 having exterior dimensions of approximately 1.25 inches by up to 1.25 inches, the platforms 22, 24 are separated by an open space gap 29 of, for example, from 0.10 to 3.0 inches, and preferably about 0.41 inches separation distance. The hubs 26 thus maintain the first platform 22 and the second platform 24 in a spaced-apart relation. The separation distance S (FIG. 4) separates the inside surface 23 of the first platform 22 from the inside surface 25 of the second platform 24. Again, in one preferred embodiment the separation distance S is about 0.41±0.30 inch.

Light sources within the first platform 22 project light via the first outlet aperture 38 and from the top outside face 27

(FIG. 3) of the first platform 22 upward (toward a nearby (e.g., 6-24 inches) ceiling 12, or in a wall-mounted embodiment via the first outlet aperture 38 and from a side outside face 27 (FIG. 3) of the platform 22 sideward (toward a nearby (e.g., 6-24 inches) supporting surface 14). The light energy is then reflected by and spread from the ceiling/wall to the areas around the module 10. Light emitted from the top/inside 25 of the second platform 24 is transmitted the distance S (FIG. 4) across the open space 29 between the platforms 22, 24, to be reflected from the first platform's inside surface 23. "Open space" in this disclosure and in the claims means that there are no components or elements of the apparatus in the volume between the platforms 22, 24; the only elements of a module 10 that span the open space 29 are the hubs 26 at the longitudinal ends of the space 29 of a module. There thus is only open air to occupy the space between the inside surfaces of the hubs 26 and between the inside surfaces 23, 25 of the first platform 22 and the second platform 24.

Figure 4:
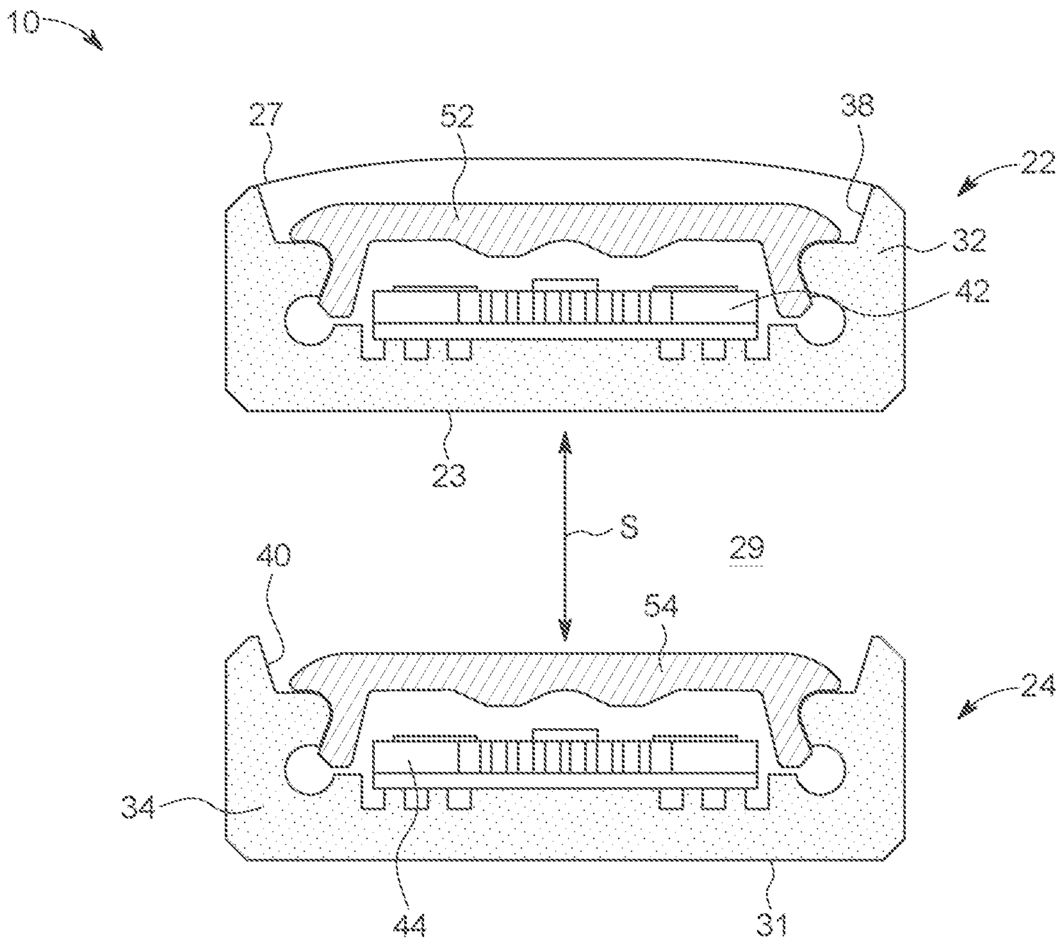
FIG. 4 is a cross sectional view of the module of FIG. 3, taken on vertical section A-A in FIG. 3, and showing certain internal components of the module.

Attention is advanced to FIG. 4, providing an enlarged vertical sectional view of a single module 10 taken at a section intermediate to the hubs 26. The module 10 includes a first platform housing 32 (of the first platform 22) and a second platform housing 34 (of the second platform 24). The housings 32, 34 may be composed, for example, of a lightweight metal, and in one preferred embodiment are fabricated from extruded aluminum. As suggested by FIG. 4, the respective housings 32, 34 may have substantially the same cross-sectional shape. At least one first direct light LED board 42 is mounted longitudinally within and along the first platform housing 32, so to emit light from the board 42 in either an upward direction (toward a ceiling 12) or in a sideways direction (toward a wall 14). Similarly, at least one second direct light LED board 44 is mounted along the second platform housing 34, so to emit light from the board 44 in either an upward direction (toward the first platform 22) or in a sideways direction (also toward the first platform), depending on how the module is oriented in the room. As mentioned, the preferred lighting source(s) in each of the platforms 22, 24, is a light emitting diode (LED) board. Each board preferably includes mid-power LEDs in a high density (up to 350 per foot) to achieve the desired beam. However, it is to be understood that light sources alternative to LEDs, e.g., organic light emitting diodes, plasma light sources, may be adapted for use in the apparatus.

Also seen in FIG. 4, each of the trough-like housings 32, 34 defines a respective outlet aperture 38 and 40. Fitted within the first outlet aperture 38 is a first control lens 52; the lens 52 thus is attached to (within) the first platform housing 32 such that the first LED board 42 is between the first platform housing 32 and the first control lens. The first platform 22 accordingly includes the platform housing 32 and first control lens 52, containing there-between the operationally associated first LED board(s) 42. Similarly fitted in the second outlet aperture 40 of the second platform housing 34 is a second control lens 54. The second control lens 54 is attached to (within) the second platform housing 34 so that the second LED board 44 is between the second platform housing 34 and the second control lens. The second platform 24 thus includes the second platform housing 34 and second control lens 54, containing there-between their operationally associated second LED board(s) 44. As indicated in FIG. 4, second outlet aperture 40 in the second housing 34 is in confronting relation, across the open space gap 29, with the first housing inside surface 23, such that light from the second light source 44 exists the second platform 24 via the second outlet aperture. Thus, the second control lens 54 is likewise in confronting relation to the inside surface 23 of the first platform 22. The second outlet aperture 40 and the first platform's inside surface 23 are in mutual registration on opposite sides of the open space gap 29. Each outlet aperture 38, 40, and each control lens 52, 54, preferably runs the full, or nearly all, the longitudinal length of its respectively associated platform 22, 24.

Control lenses 52, 54, are linear optics that receive incoming light and shape outgoing rays in any of a variety of suitable beam arrays. The lenses are preferably linear extrusion lenses with precise light control, and may be composed of diffused polymethyl methacrylate, or polycarbonate, with high optical efficiency. Lenses 52, 54 suitable for use in the apparatus are available from Khatod North America, LLC, Pembroke, MA 02359, USA. The control lenses 52, 54 may be the same, or different, in their optical characteristics, and are selected to project light beams from the platform according to the desired pattern.

As mentioned, the hubs 26 hold the platforms 22, 24 in spaced-apart (preferably parallel) relation, there being the separation distance S between them (FIG. 4). The first LED board 42 in the first platform housing 32 emits light (not necessarily of the same wavelengths as those emitted by the second LED board 44), through the first control lens 52 and from the second platform 24, and to the surrounding environment (e.g., including to be further reflected from a nearby wall or ceiling). The second LED board 44 in the second platform housing 34 emits light rays which pass through the second control lens 54, then from the second platform 24, and across the separation distance S toward the first platform 22. Light from the second platform 24 strikes the inside surface 23 of the first platform 22 and is reflected therefrom. The inside surface 23 of the first platform 22 ordinarily is a brushed aluminum surface, which optionally may be painted, so to reflect incident light in an indiscriminate, dispersed, manner into the surrounding environment. The provided light may be standard white lighting, correlated color temperature (CCT) from 2700K to 5000K or RGB/RGBW. A module 10 output may be selected to be low (4.0 W/ft), medium (8.0 W/ft), or high (12.0 W/ft), depending on particular need.

An aspect of the general apparatus and system is its modularity. Two or more modules 10 may be connected to provide compound, more sophisticated, configurations whereby extended runs of lighting fixture may be supplied to larger areas to be illuminated. By connecting two or more modules 10 end-to-end, serial combinations of modules can be configured in a wide variety of linear or squared lighting system runs. This yields a versatility that permits systems according to the present invention to be adapted to the circumstances and environment where illumination is provided. Linear and squared runs can be arranged to maximize lighting to needed areas in a room or rooms, along a hallway, etc. Any of a myriad of potential configurations of modules 10 may be planned and selected to efficiently optimize the illumination of desired areas, as well as to harmonize the lighting system to the architecture and interior (or exterior) design of the areas and spaces to be lit.

Figure 5:
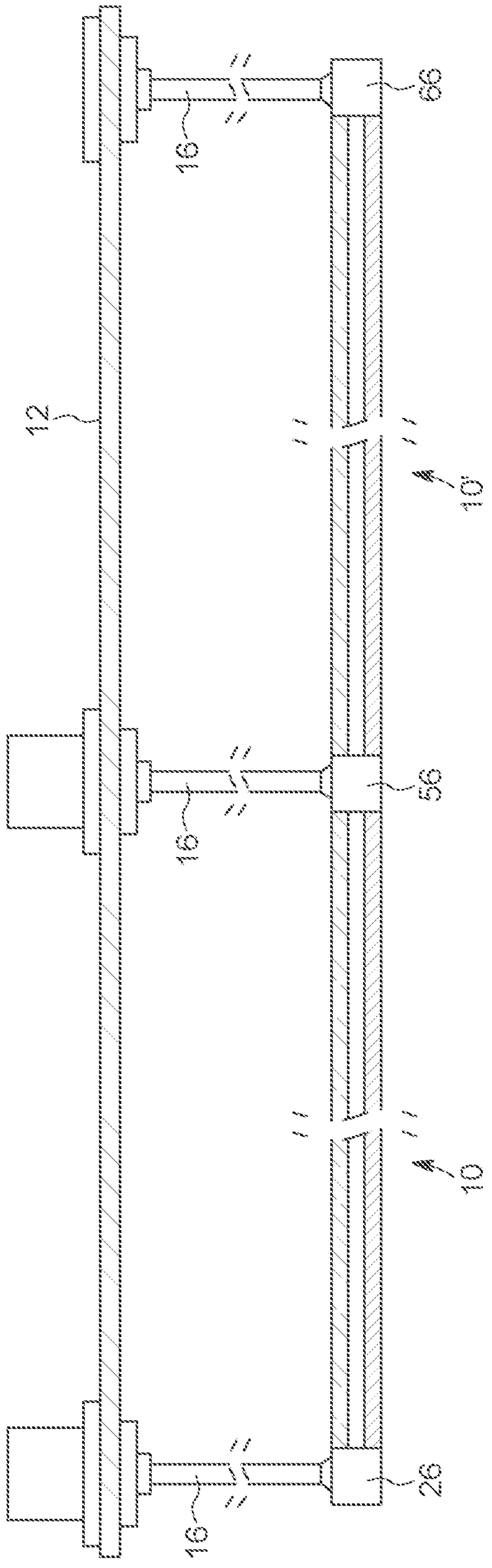
FIG. 5 is a side view of two modules arranged in a linear arrangement, exemplifying that multiple modules may be interconnected to provide arrays of modules.

Reference is made to FIG. 5, for example, showing a basic linear specification of a lighting run system composed of two modules 10, 10' including three hubs 26, 56, 66. The hubs 26, 56, 66 may be connected to either a ceiling or a wall, as previously explained. There is a hub at an end of each module 10, 10' including a shared joiner hub 56 that interconnects the modules 10, 10'. A person skilled in the art immediately appreciates that a plurality of two, three, or more modules 10, 10' may be serially connected to provide lengthier runs of linear lighting fixture, as long as may be desired and selected according to circumstantial need.

A system according to the present invention thus optionally includes an apparatus having two modules joined by a shared hub. In such systems, the longitudinal axes of the two modules may be substantially collinear. Alternatively, the longitudinal axes of the two modules may define an angle, most commonly a right angle (90 degrees). It readily is understood that more complex systems have more than two modules, and the plurality of such modules can be interconnected and arranged in a wide variety of special and geometric configurations by associating modules end-to-end. In this regard, specially configured corner hubs may be used with two or multiple modules to construct lighting systems with angled corners, with corner hubs adapted to be shared by an operatively adjacent pair of modules. A person skilled in the art recognizes that a plurality of two, three, or more modules may be serially connected to provide runs of linear lighting fixtures that define an overall square, or rectangular configuration, and illuminating an area as large as may be desired and selected according to circumstantial need. The various configuration possibilities for a lighting system run comprised of a plurality of modules is expansive and almost endless.

We note that while one first LED board 42 and one second LED board 44 are seen in FIG. 4, in the preferred embodiment a plurality of LED boards is disposed within each of the housings 32, 34. "At least one" or "an" LED board accordingly refers in the preferred embodiment to a plurality of LED boards arranged end-to-end in an operative series along substantially the full length of the respective platform housings 32, 34, and in parallel registration with the nearby apertures 38, 40 along their lengths. Pluralities of lenses 52, 54 are similarly disposed in respective platforms 22, 24. The light beam emitted from a given LED board 42 or 44 overlaps axially with the beam from an adjacent LED board, so that light rays are substantially uniformly emitted from the associated aperture 38 or 40 along the length of the corresponding platform 22, 24.

Figure 6:
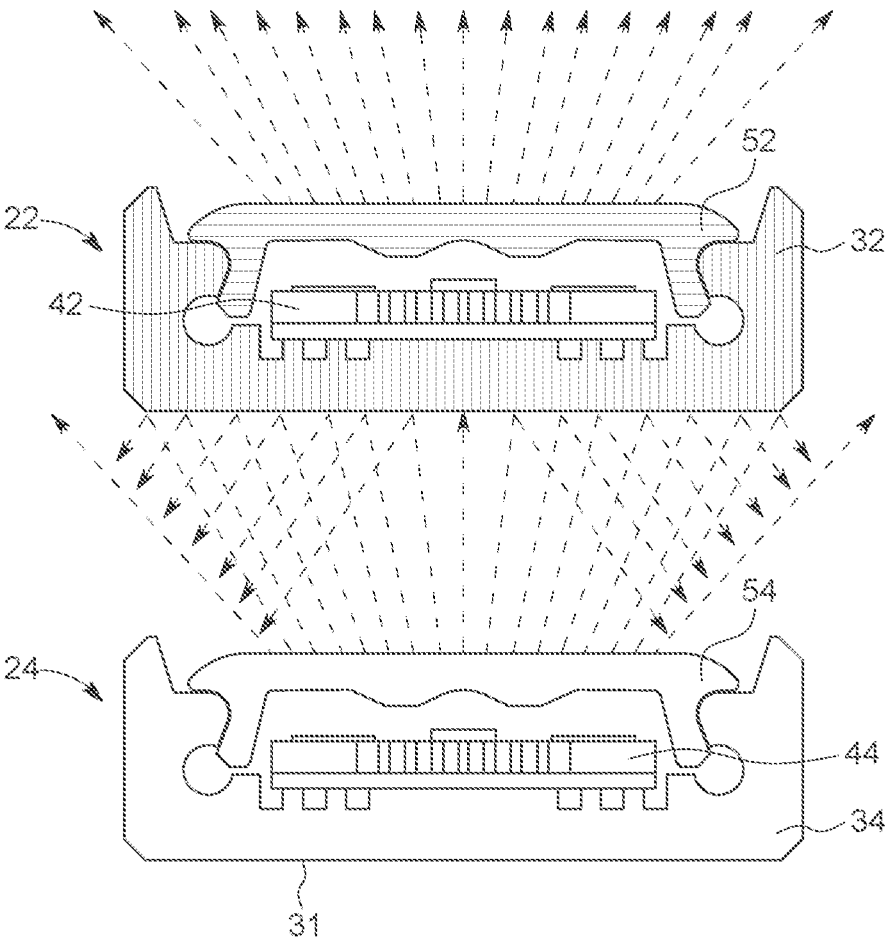
FIG. 6 is an enlarged cross sectional view of a module, similar to the view of FIG. 4, illustrating with dashed lines possible light ray patterns emitted within and from a module.

FIG. 6 depicts conceptually with dashed ray lines the emission of light generated by the first LED boards 42 and second LED boards 44, and (via the control lenses 52, 53) from the respective platforms 22, 24, of a module 10. Light from the first LED board 42 transits, and is refracted or selectively shaped by, the first control lens 52. The light then is broadcast via the first outlet aperture 38 (and thus from the top outside face 27 of the first platform 22 (in a ceiling-mounted module 10 (FIG. 1A)), or via the aperture 38 (and from the side outside face 27 of the first platform that faces a nearby wall or other mounting surface (FIG. 2A)), to illuminate the environment around the module. Light rays from the second LED boards 44 pass through and are shaped by the second control lens 54. A major portion of light exiting the second control lens 54 is incident upon the inside surface 23 (FIG. 4) of the first platform housing 32, and is then reflected therefrom, as suggested by FIG. 6. Light reflected from the inside surface 23 re-crosses the space gap 29, eventually to exit the lateral sides of the module 10 to illuminate the module's surroundings (as indicated by the downwardly directed light rays in FIG. 6). A lesser portion of the light from the second platform 24 passes angularly upward through the gap 29 (also see FIG. 4) between the platforms 22, 24 without striking the housing 32 of the first platform 22, and is transmitted directly from the sides of the module 10 as also suggested in FIG. 6. Thus, some of the illumination from the second platform 24 is provided directly to the environment surrounding the module 10.

Figure 7:
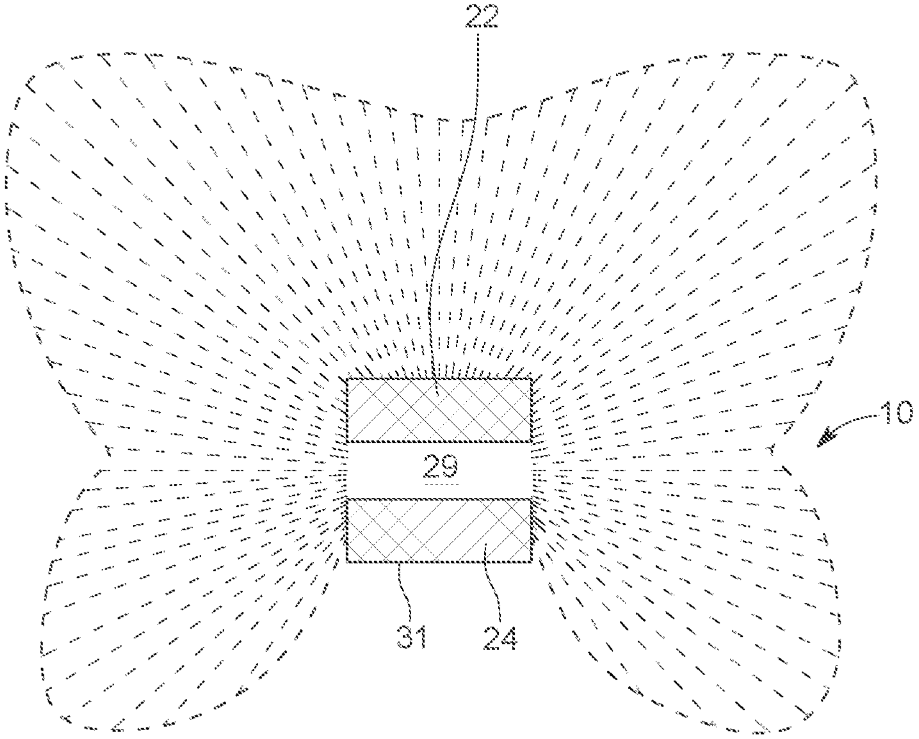
FIG. 7 is a vertical sectional view of the platforms of a module, showing the overall pattern of the beam array emitted from a module.

The overall lighting effect generated by the FIG. 6 configuration of a module 10 is shown in FIG. 7, which is a vertical sectional view of a module, intermediate of its two hubs 26. The light transmitted from the module defines a generally butterfly or double batwing beam distribution. The intensity of the light is greater in lobed quadrants at two, four, eight, and ten o'clock positions (relative to the axis of the module 10), while there is comparatively reduced illumination from the three, nine, and twelve o'clock directions, and little or no light is transmitted directly from the outside surface 31 of the second platform 24.

There is provided according to this disclosure, therefore, a lighting apparatus that has at least one module 10, with each module including a first platform 22 having a first housing 32 with an inside surface 23 opposite a first outlet aperture 38, a first light source 42 in the first housing, a second platform 24 having a second housing 34, second light source 44 in the second housing, and at least one hub 26 connecting the first and second platforms together and holding the housings in spaced-apart relation. There is an open space gap 29 between the platforms 22, 24 wherein light from the first light source 42 exits the first platform 22 via the first outlet aperture 38; and at least some light from the second light source 44 reflects from the inside surface 23 and then exits the module. At least some other light from the second light source 44 crosses the open space gap 29 and exits the module 10 directly, without reflecting from the inside surface 23 of the first platform. Both light sources 42, 44 preferably, but not necessarily, are one or more light emitting diode boards.

A second outlet aperture 40 is defined in the second housing 34 and in confronting relation, across the open space gap 29, with the first housing inside surface 23, wherein light from the second light source 44 exits the second platform 24 via the second outlet aperture. A first control lens 52 preferably is fitted in the first outlet aperture 38, and a second control lens 54 preferably is fitted in the second outlet aperture 40.

A module 10 is connectable to a wall 14 or to a ceiling 12, and the light exiting the first platform 22 is transmitted directly to the wall or ceiling while at least some of the light from the second light source 44 reflects from the inside surface 23 of the first platform before transmission to the wall or ceiling.

Although the invention has been described in detail with particular reference to these preferred embodiments, other embodiments can achieve the same results. The present invention can be practiced by employing conventional materials, methodology and equipment.

Accordingly, the details of such materials, equipment and methodology are not set forth herein in detail. In the previous description, specific details are set forth, such as specific materials, structures, processes, etc., in order to provide a thorough understanding of the present invention. However, as one having ordinary skill in the art would recognize, the present invention can be practiced without resorting to the details specifically set forth. In other instances, well known structures have not been described in detail, in order not to unnecessarily obscure the present invention.

Only some embodiments of the invention and but a few examples of its versatility are described in the present disclosure. It is understood that the invention is capable of use in various other combinations and is capable of changes or modifications within the scope of the inventive concept as expressed herein. Modifications of the invention will be obvious to those skilled in the art and it is intended to cover in the appended claims all such modifications and equivalents.

What is claimed is:

1. A lighting apparatus comprising:
at least one module comprising:
a first platform having a first housing with an inside surface opposite a first outlet aperture;
a first light source in the first housing;
a second platform having a second housing;
second light source in the second housing;
and
at least one hub connecting the first and second platforms together and holding the housings in spaced-apart relation, there being an open space gap between the platforms;
wherein light from the first light source exits the first platform via the first outlet aperture; and
at least some light from the second light source reflects from the inside surface of the first housing and then exits the module.

2. The lighting apparatus according to claim 1 wherein at least some other light from the second light source crosses the open space gap and exits the module directly without reflecting from the inside surface of the first housing.

3. The lighting apparatus according to claim 1 wherein:
the first light source comprises at least one light emitting diode board; and
the second light source comprises at least one light emitting diode board.

4. The lighting apparatus according to claim 1 further comprising a second outlet aperture in the second housing and in confronting relation, across the open space gap, with the first housing inside surface, wherein light from the second light source exits the second platform via the second outlet aperture.

5. The lighting apparatus according to claim 4 further comprising a first control lens fitted in the first outlet aperture.

6. The lighting apparatus according to claim 4 further comprising a second control lens fitted in the second outlet aperture.

7. The lighting apparatus according to either claim 4 wherein the module is connectable to a wall or to a ceiling, and:
the light exiting the first platform is transmitted directly to the wall or ceiling; and
the at least some light from the second light source light reflects from the inside surface of the first housing before transmission to the wall or ceiling.

* * * * *